Nov. 18, 1941.  C. L. KNECHT  2,262,849

COLLET ACTUATING DEVICE

Filed Dec. 20, 1939

*INVENTOR.*
CARL L. KNECHT
BY Whittemore Hulbert + Belknap
*ATTORNEYS*

Patented Nov. 18, 1941

2,262,849

UNITED STATES PATENT OFFICE 2,262,849

COLLET ACTUATING DEVICE

Carl L. Knecht, Trenton, Mich., assignor to Modern Collet & Machine Company, Ecorse, Mich., a corporation of Michigan Application December 20, 1939, Serial No. 310,247

2 Claims. (Cl. 279—1)

The invention relates to collets of the type used in hollow spindle machine tools for the holding of the stock bar during the performance of work thereon. More particularly, the invention relates to the actuating mechanism for the collet by which it is operated to clamp and to release the work during the continuous rotation of the hollow spindle. It is the object of the invention to obtain a construction having certain advantages over and avoiding certain defects of mechanisms of the type heretofore used. To this end the invention consists in the construction as hereinafter set forth.

Figure 1:
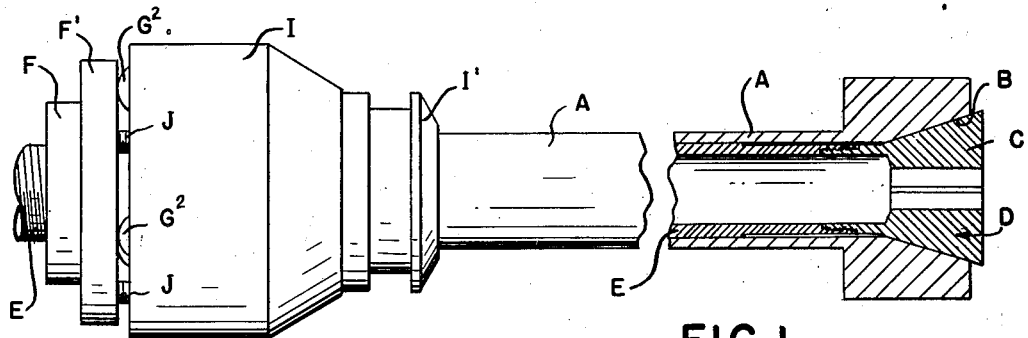
Figure 1 is a sectional side elevation of the hollow spindle and its collet provided with my improved actuating mechanism.

My improvements are applicable to any hollow spindle machine tool provided with a work holding collet, but as specifically illustrated, A is the spindle provided at its forward end with a flaring or conical recess B for engaging the jaws C of a split collet member D. This collet member is attached to the usual tubular actuating member E extending longitudinally within the spindle A to the rear end thereof. A collar F is attached to the rear end of the member E to receive the thrust of the actuating means, thereby moving the member E axially within the spindle and causing the radial contraction of the jaws C.

The construction as thus far described is common to most hollow spindle machine tools which are also provided with means mounted upon the hollow spindle for exerting a thrust on the collar F when the collet is to be clamped to the work. With certain constructions this is accomplished by a lever mounted on the spindle and bearing against the collar, together with a slidable collar on the spindle having a cam portion for moving the actuating end of the lever radially outward. The lever is in the form of a bell crank which is fulcrumed on a pivot pin having a radially outwardly extending short arm bearing against the collar on the inner tube and a longer arm for engaging the cam on the slidable collar. One objection to this construction is that when the spindle is revolving at high speed centrifugal force tends to throw the actuating end of the lever outward, which necessitates the use of springs or other means for counterbalancing this force. Another objection is that the pin forming the fulcrum bearing is necessarily of small diameter so as to be easily sheared.

With my improved construction of actuating mechanism I employ a plurality of floating levers G, preferably three, which are distributed around the circumference of the hollow spindle in equispaced relation. These levers are provided with radially outwardly extending toe portions G' which at their outer ends bear against end thrust shoulders H formed on a collar H' threadedly or otherwise secured to the hollow spindle A. The collar H' is longitudinally recessed for the passage of the lever G therethrough and an axially extending shoulder H² holds the portion G' against radially outward movement. The end G² or heel portion of the lever, bears against the collar F at a point radially inward from the fulcrum bearing. Consequently, when the opposite end G³ of the lever is moved radially inward, the end G² will exert an axial thrust against the collar F, while on the other hand a radially outward movement of the end G³ will release the axial pressure on said collar. All of the levers G are simultaneously actuated by a surrounding member I projecting axially from a collar I' slidable on the spindle A. The member I has a conical portion I² forming a cam which when the collar I' is moved axially to the left, Figure 2, will press all of the actuating arms G³ radially inward. On the other hand, when the collar I' is moved to the right, Figure 2, the cam I² will be withdrawn permitting the levers to be moved radially outward by centrifugal action, as well as by the thrust of the collar F.

With the construction as described, the thrust exerted by the levers G against the collar F is distributed on opposite sides of the axis thereof thereby avoiding any lateral thrust on the tubular member E which might cause it to bind within the hollow spindle A. Another advantage of the construction is in substituting a rigid shoulder H as a fulcrum for the portions G' of the levers, in place of pivot pins which are so easily sheared. Still another advantage is in using centrifugal force for releasing the clamping pressure of the levers and in positively actuating said levers in a radial inward direction by the sliding collar I' and cam I².

For convenience in manufacture the collar H' is preferably formed of an inner member H³ and an outer member H⁴. The inner member H³ is provided with radially outwardly extending opening slots forming the recesses for receiving the levers G, and the outer member H⁴ is counterbored to form a fulcrumed shoulder H opposed to the other head, and a shoulder H⁷ for limiting radial outward movement of the levers. These members are secured to each other in any suitable way, but as shown have a threaded engagement H⁵.

Figure 2:
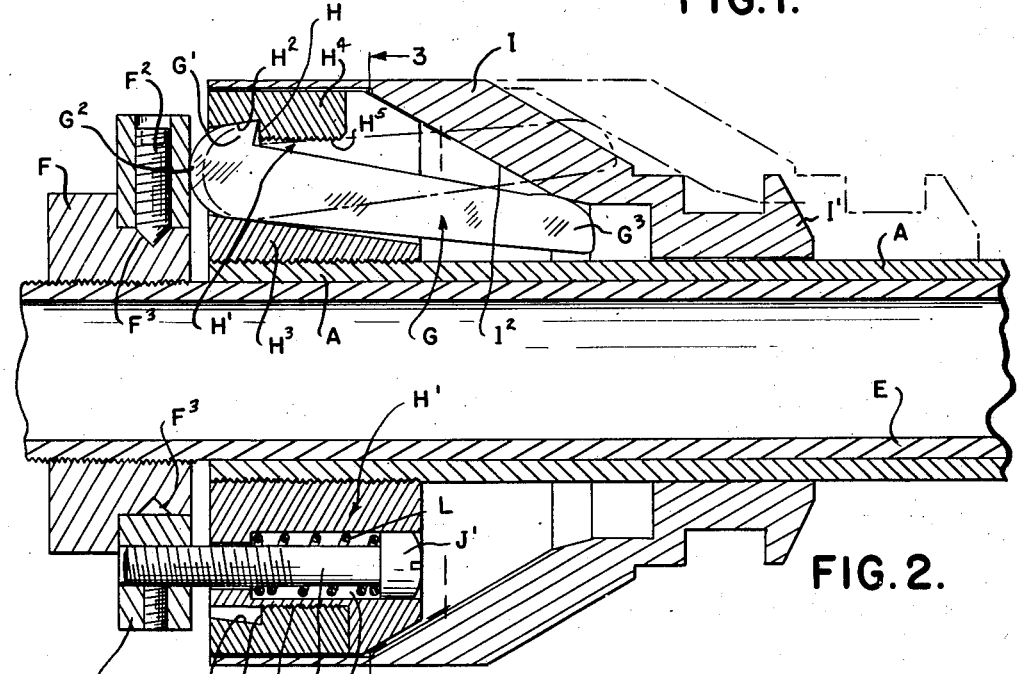
Figure 2 is an enlarged longitudinal section through the operating mechanism.
Figure 3:
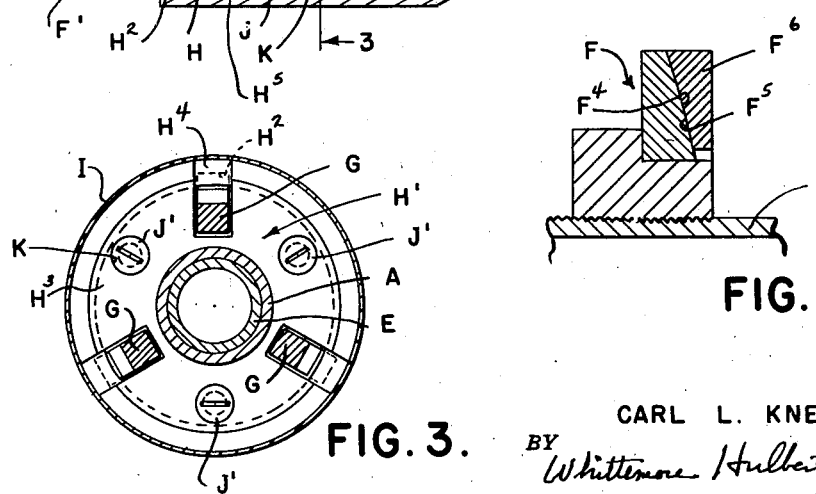
Figure 3 is a cross section on line 3—3 of Figure 2.

Instead of having the levers G bear directly against the collar F, I preferably provide an annular shoe member F', which is attached to the head or collar H' to be in rotatively fixed but axially movable relation thereto. The attachment means comprises a series of bolts J passing through counterbored apertures K in the collar H' and threadedly engaging the shoe F'. Springs L sleeved on these bolts between the heads J' thereof and the end of the counterbore, serve to resiliently draw the shoe F' toward the collar. The shoe F' has a swivel attachment to the head F which as shown in Figure 2 comprises pointed screws F² extending radially through the shoe to engage an annular recess F³ in the head F. Thus where there is any relative rotary movement between the spindle and the tube E the swivel engagement will permit corresponding relative movement between the head F and shoe F'.

Figure 4:
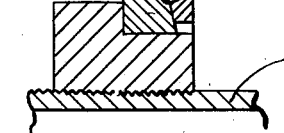
Figure 4 is a section similar to a portion of Figure 2, showing a modified construction.

In the commercial manufacture of the mechanism it is difficult to form the parts with such degree of accuracy that all of the levers G will simultaneously contact with the collar F. In the modified construction shown in Figure 4, the collar F is formed with a convex spherical surface F⁴ which is engaged by a corresponding concave spherical surface F⁵ on an annular shoe member F⁶. The ends G² of the lever G bear against this member F⁶ and in case one of the levers contacts with said member in advance of the others, this will cause a slight relative movement between the spherical surfaces F⁴ and F⁵, permitting the other levers to come into full contact before clamping pressure is exerted.

What I claim as my invention is:

1. The combination with a hollow spindle, a work holding collet therein and a tubular actuating member for said collet within and extending through said spindle, of operating means comprising a pair of adjacent heads respectively secured to said spindle and tubular member, said spindle head having a plurality of longitudinally extending recesses therein distributed about the axis thereof, an annular member surrounding and secured to said head and having a counterbore forming a recess and an end thrust shoulder, the latter opposed to the other head, floating levers located in said recesses each provided with a longitudinally extending actuating arm, a radially outwardly extending toe portion engaging said counterbore and fulcrumed against said shoulder, and a heel portion bearing against the other head, a collar slidably mounted on said spindle having a sleeve portion surrounding said levers including a conical cam portion for simultaneously forcing the actuating arms of all of said levers radially inward thereby separating said heads and effecting the clamping of the work by said collet.

2. The combination with a hollow spindle, a work holding collet therein and a tubular actuating member for said collet within and extending through said spindle, of operating means comprising a pair of adjacent heads respectively secured to said spindle and tubular member, said spindle head having a plurality of longitudinally extending recesses therein distributed about the axis thereof, an annular member surrounding and secured to said head having a counterbored portion forming an end thrust shoulder opposed to the other head, a plurality of floating levers located in said recesses each lever having a longitudinally extending actuating arm, a toe portion extending radially outward into the counterbore and fulcrumed upon said shoulder, and a heel portion bearing against the other head, a collar longitudinally slidable upon said spindle, and a sleeve projecting from said collar to surround said levers being provided with a conical cam portion for simultaneously engaging the ends of the actuating arms of said levers to force the same radially inward thereby separating said heads and effecting the clamping of the work by said collet.

CARL L. KNECHT.